(12) United States Patent  (10) Patent No.: US 8,548,030 B2
Shinozaki  (45) Date of Patent: Oct. 1, 2013

(54) RELAY APPARATUS

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 135 days.

(21) Appl. No.: 12/792,784

(22) Filed: Jun. 3, 2010

(65) Prior Publication Data

US 2010/0238982 A1    Sep. 23, 2010

Related U.S. Application Data

(63) Continuation of application No. PCT/JP2007/073690, filed on Dec. 7, 2007.

(51) Int. Cl.
| | |
|---|---|
| *H04B 3/36* | (2006.01) |
| *H04B 7/17* | (2006.01) |
| *H04B 17/02* | (2006.01) |
| *H04L 25/20* | (2006.01) |
| *H04L 25/52* | (2006.01) |

(52) U.S. Cl.
USPC .......... 375/211; 178/70 R; 370/279; 370/293; 370/315; 370/492; 370/501; 379/338; 455/7

(58) Field of Classification Search
None
See application file for complete search history.

(56) References Cited

U.S. PATENT DOCUMENTS

| | | | |
|---|---|---|---|
| 5,233,629 A | 8/1993 | Paik et al. | |
| 5,321,725 A | 6/1994 | Paik et al. | |
| 5,691,995 A | 11/1997 | Ikeda et al. | |
| 6,570,849 B1* | 5/2003 | Skemer et al. | 370/230.1 |
| 6,766,489 B1 | 7/2004 | Piret et al. | |
| 2003/0223467 A1* | 12/2003 | T. | 370/537 |
| 2006/0062314 A1 | 3/2006 | Palin et al. | |
| 2006/0080581 A1* | 4/2006 | Ono | 714/704 |
| 2007/0183510 A1* | 8/2007 | Seong et al. | 375/240.25 |
| 2008/0075031 A1* | 3/2008 | Ohayon et al. | 370/316 |
| 2008/0172593 A1* | 7/2008 | Rainish et al. | 714/776 |

FOREIGN PATENT DOCUMENTS

| | | |
|---|---|---|
| JP | 06-181567 | 6/1994 |
| JP | 07-283740 | 10/1995 |
| JP | 2000-156646 | 6/2000 |
| JP | 2002-198946 | 7/2002 |
| JP | 2003-087225 | 3/2003 |
| JP | 2003289293 | 10/2003 |
| JP | 2005-252622 | 9/2005 |
| JP | 2005536097 | 11/2005 |

OTHER PUBLICATIONS

International Preliminary Report on Patentability and Written Opinion of the International Searching Authority in PCT/JP2007/073690 filed Dec. 7, 2007.
International Search Report issued in PCT/JP2007/073690, dated Feb. 26, 2008.
S. Wenger et al., RTP Payload Format for H.264 Video, RFC3984, Feb. 2005, p. 34,47 [retrieved on Feb. 13, 2008]. Retrieved from the Internet: <URL: http://www.rfc-editor.org/rfc/rfc3984.txt>.
Notice of Reason for Rejection dated Jun. 5, 2012 received in corresponding Japanese Patent Application No. 2009-544543.

* cited by examiner

*Primary Examiner* — Shuwang Liu
*Assistant Examiner* — Gina McKie
(74) *Attorney, Agent, or Firm* — Smith, Gambrell & Russell, LLP

(57) ABSTRACT

A relay apparatus, comprises a reception section that receives real-time data, a monitoring section that periodically detects quality of a transmission path to be used for transmitting the real-time data toward a destination thereof, a determination section that determines a length of an interleaving cycle according to the quality of the transmission path, an interleaving section that interleaves the real-time data in the interleaving cycle having the determined length, and a transmission section that transmits the interleaved real-time data to the transmission path.

8 Claims, 16 Drawing Sheets

FIG. 14

| 0 | 1 | 2 | 3 | 4 | 5 | 6 | 7 |
|---|---|---|---|---|---|---|---|
| F | NRI | | Type | | | | |

RELAY APPARATUS

CROSS-REFERENCE TO RELATED APPLICATION

This is a continuation of Application PCT/JP2007/073690, filed on Dec. 7, 2007, now pending, the entire contents of which are incorporated herein by reference.

FIELD

The present invention relates to a relay apparatus.

BACKGROUND

Wireless network (mobile communication network) systems are typified by a network system using a wireless LAN (IEEE 802.11) as illustrated in FIG. 1 (wireless LAN system), and a cellular network system as illustrated in FIG. 2 (3GPP).

As illustrated in FIG. 1, for example, the wireless LAN system includes a media server, a radio network gateway connected to the media server via a link (network), and an access point (AP) accommodated in the radio network gateway. A terminal (such as personal computer (PC) or personal digital assistant (PDA)) is connected to the AP via a wireless link (wireless transmission path). The section between the AP and the terminal constitutes a wireless section of a data transmission path.

As illustrated in FIG. 2, for example, the cellular network system (cellular phone network system) includes a server, a gateway (GW: router) connected to the server via a link, a switching device (xGSN) connected to the GW via an IP network such as the Internet, a radio network controller (RNC) connected to the switching device via a link, and a base station device (Node B or BS) connected to the radio network controller via a link. A mobile terminal (user equipment or mobile node) is connected to the base station device via a wireless link (wireless transmission path). The section between the mobile terminal and the base station device constitutes a wireless section of a data transmission path.

With regard to communication (wireless communication) in the wireless section, as effective techniques for reducing transmission errors of data to be received, there are provided interleaving for data to be transmitted, and error correction using forward error correction (FEC). Those are employed in, for example, the cellular network system.

FIG. 3 is a diagram illustrating a general protocol stack in a case where the IEEE 802.11 is applied to a wireless network. There is provided H.264/AVC as one of video compression standards to be applied to real-time streaming services applicable to the wireless network system. In the H.264/AVC, in order to provide streaming services, a real-time transfer protocol/RTP control protocol (RTP/RTCP) is used as a lower-layer protocol thereof. The interleaving may be performed on real-time data to be transferred in conformity to the RTP/RTCP (RTP packet) in consideration of the wireless environment (see Non-patent Document 1, in particular, section 12.6 and section 13).

Accordingly, the upper-level transmission protocol of the RTP/RTCP may provide robust data transmission even when the lower-layer link is a wireless link.

Streaming data is used for services that require instantaneous reproduction, such as live programs, live broadcast, and video teleconferences. In other services such as on-demand video program distribution, streaming data is allowed to be buffered temporarily. For example, with regard to a reproduction timing on a timeline (time base) at the time of data reproduction, reproduction is started after a certain amount of data is buffered. Further, services such as TV program distribution do not require all pieces of data transmitted from the media server to reach the receiver side at the time of data reproduction.

Patent Document 1: Japanese Laid-open Patent Publication No. 2005-536097

Patent Document 2: Japanese Laid-open Patent Publication No. 2002-198946

Patent Document 3: Japanese Laid-open Patent Publication No. 06-181567

Patent Document 4: Japanese Laid-open Patent Publication No. 2000-156646

Non-patent Document 1: RFC 3984 RTP Payload Format for H.264 VIDEO

However, the wireless environment largely changes as compared with a fixed line. Therefore, the cycle in which interleaving is performed (interleaving cycle) does not always suit to the wireless environment, which may cause a case where a transmission error reduction effect obtained through the interleaving is not exerted sufficiently.

Streaming data (real-time data) to be transmitted in a real-time service or other such data has much less opportunities for recovery thereof through retransmission performed in a case where a transmission error has occurred, as compared with a non-real-time service. Therefore, a concealment technology (error correction technology) to be used in the real-time service at the time when a transmission error has occurred is more important than in the case of the non-real-time service.

In wireless transmission, in a case where a situation has changed from an error free environment to an error prone environment, for example, in order to maintain constant quality of the transmission path, that is, achieve quality of the wireless transmission path in which error correction is possible, redundant codes constituting error correction codes are increased and/or a modulation scheme is changed (for example, the modulation scheme is changed from QPSK to BPSK) as well as transmission power control, to thereby reduce a transmission bandwidth for an upper-level application.

Such a situation that the transmission bandwidth is reduced is inconvenient for real-time data. Specifically, the reduction in transmission bandwidth due to deterioration in transmission quality has a fear that a time of arrival of data to be transmitted within a certain time period at its destination is extremely delayed. In addition, there is a fear that data is continuously discarded at the destination due to the deteriorated quality of the transmission path, before the bandwidth is adjusted in the wireless section.

The situation described above, in which the arrival time is delayed or data is continuously discarded, also results from hard handover. FIG. 4 is an explanatory diagram illustrating occurrence of discard and dwell of data at the time of hard handover.

Specifically, in a case where a bandwidth usable at a handover destination is narrower than a bandwidth used at a handover source, temporary data missing occurs at the time of handover. In other words, when a path of data for a certain area is switched to a path for another area, data for which the switching is in progress may be lost. When such data loss occurs, reproduction is not performed on the destination side until the lost data is compensated through retransmission, with the result that data dwell (long-time buffering) may occur. In other words, there is a fear that the data loss significantly influences reproduction of real-time data in a specific time period.

As described above, in the mobile communication network in which the communication environment changes variously, the interleaving cycle for performed interleaving, which is uniquely determined in conformity to, for example, the RFC 3984, may not always be an appropriate cycle.

SUMMARY

According to one aspect of the present invention, there is provided a relay apparatus including:

a reception section that receives real-time data;

a monitoring section that periodically detects quality of a transmission path to be used for transmitting the real-time data toward a destination thereof;

a determination section that determines a length of an interleaving cycle according to the quality of the transmission path;

an interleaving section that interleaves the real-time data in the interleaving cycle having the determined length; and a transmission section that transmits the interleaved real-time data to the transmission path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 14 is a diagram illustrating a data structure of a NAL unit header.

DESCRIPTION OF EMBODIMENTS

Hereinbelow, description is given of an embodiment of the present invention. A configuration of the embodiment is merely an example, and the present invention is not limited to the configuration of the embodiment.

BACKGROUND OF THE INVENTION

As described above, in the case where the interleaving cycle for the data on the sender side does not suit to the wireless environment, the transmission bandwidth may be reduced. In such a situation, in a case where the RFC 3984 is applied to wireless communication, for example, to perform encoding and transmission in real time, it is assumed that the interleaving cycle is changed on the sender side based on feedback information or the like in the case where the interleaving cycle does not suit to the wireless environment. However, the method described above is not applicable because various kinds of feedback information are generated at a time of broadcast data transmission.

Further, in a case where data to be interleaved is data that has already gone through encoding including interleaving processing, the interleaving cycle that has been determined at the time of the encoding is fixed. Hence, such an interleaving cycle may not be ignored so as to change the interleaving cycle according to the wireless environment (communication status).

It is an object of a relay apparatus according to this embodiment to absorb, in a case where the relay apparatus transmits, toward a destination, real-time data received from a transmission source, an error caused by a fluctuation in quality of a transmission path on the sender side, and to suppress deterioration in reception quality on the data receiver side.

In other words, in view of the situation described above, the embodiment of the present invention proposes a technology that enables an interleaving cycle to be varied dynamically according to quality of a transmission path when handling a real-time service such as video stream transmission.

Outline of the Embodiment

Figure 5:
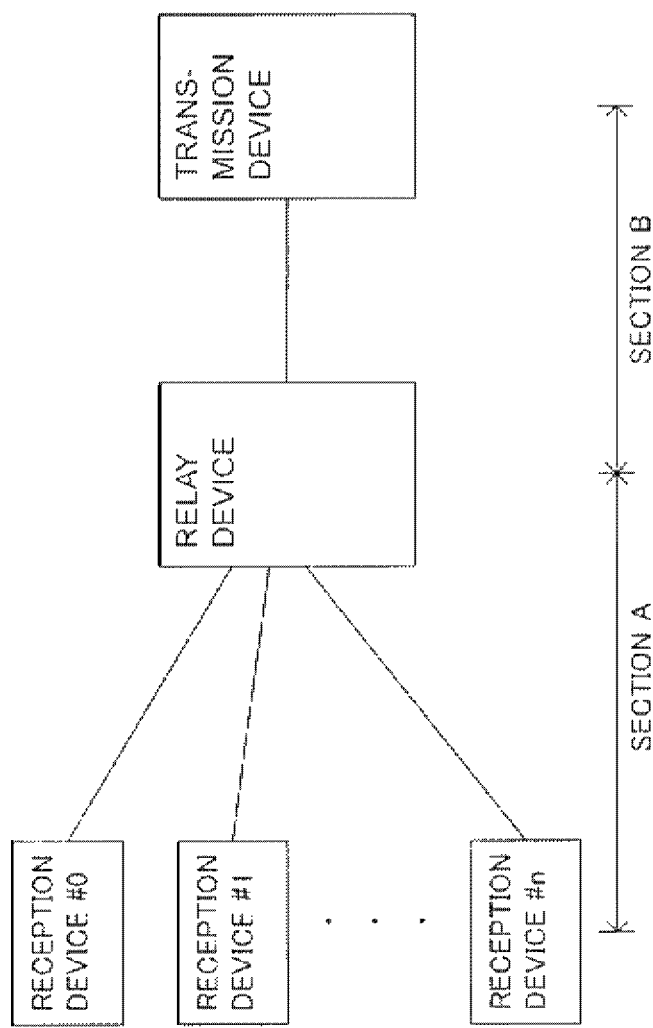
FIG. 5 is a diagram illustrating an example of a basic network structure according to an embodiment of the present invention.

FIG. 5 is a diagram illustrating an example of a basic network structure according to this embodiment. A network system illustrated in FIG. 5 generally includes at least one reception device (#0 to #n), a relay device (transfer device) connected to each reception device via a link, and a transmission device connected to the relay device via a link. A data transmission path between the transmission device and each reception device is constituted by a section A ranging from the reception device to the relay device, and a section B ranging from the transmission device to the relay device.

A dynamic interleaving cycle changing method described in the following embodiment is applied to, for example, the relay device illustrated in FIG. 5. If the network system illustrated in FIG. 5 is a wireless LAN system, the relay device corresponds to, for example, a radio network gateway or an access point. If the relay device of FIG. 5 is provided in a cellular network (cellular phone network) system, the relay device corresponds to, for example, a radio network controller (RNC) and/or a base station device (Node B).

It is desired that the dynamic interleaving cycle changing method be applied to an environment in which the section A has a great fluctuation in quality of the transmission path with time and hence the bandwidth capable of transmission fluctuates according to the quality of the transmission path (for example, in a case where the section A is a wireless transmission path). It should be noted that, in FIG. 5, the dynamic interleaving cycle changing method is inevitably applied even in a case where the section A is a wired transmission path or in a case where the section A does not have even a slight fluctuation in quality of the transmission path.

Figure 6:
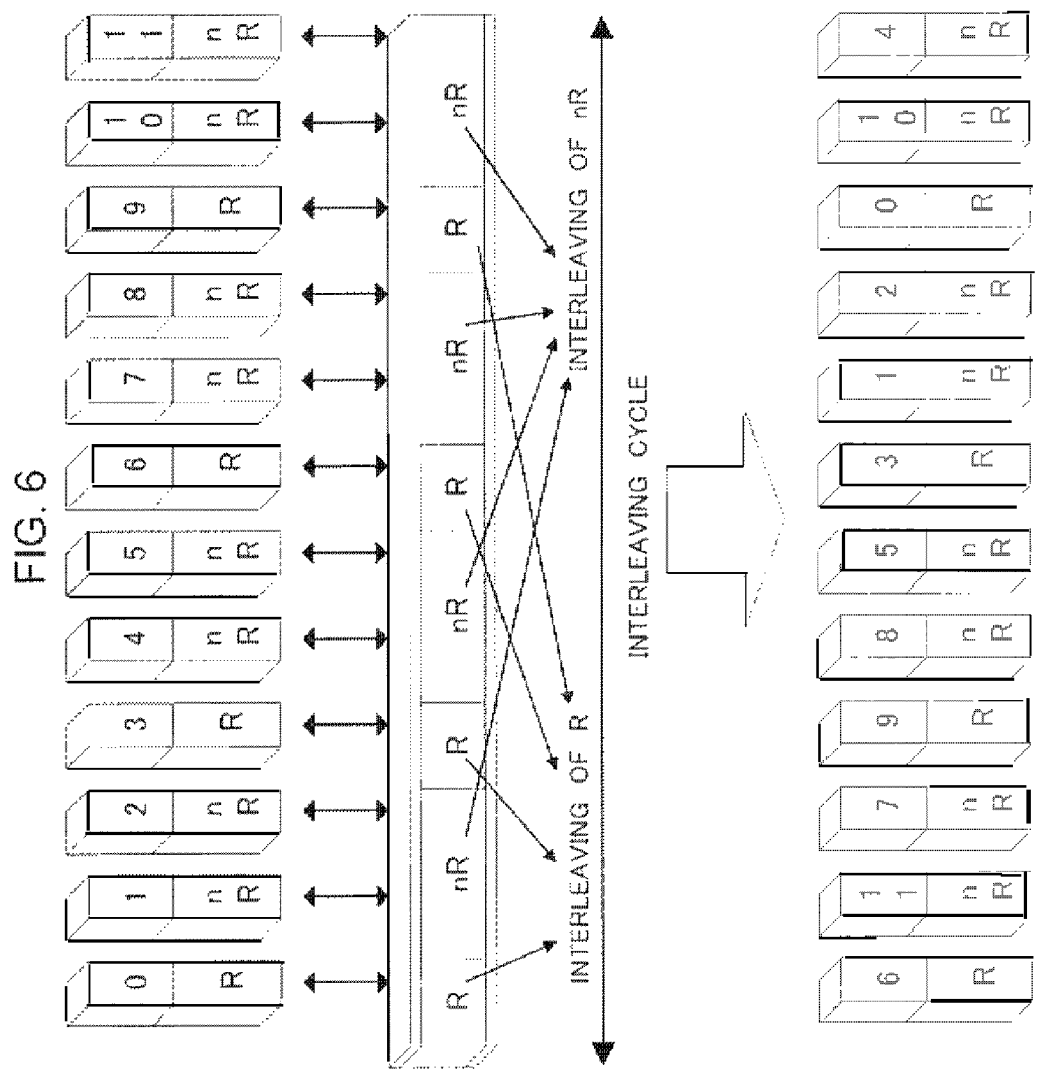
FIG. 6 is an explanatory diagram illustrating a dynamic interleaving cycle changing method, which illustrates a case where interleaving is performed for each type (among reference pictures and among non-reference pictures).
Figure 7:
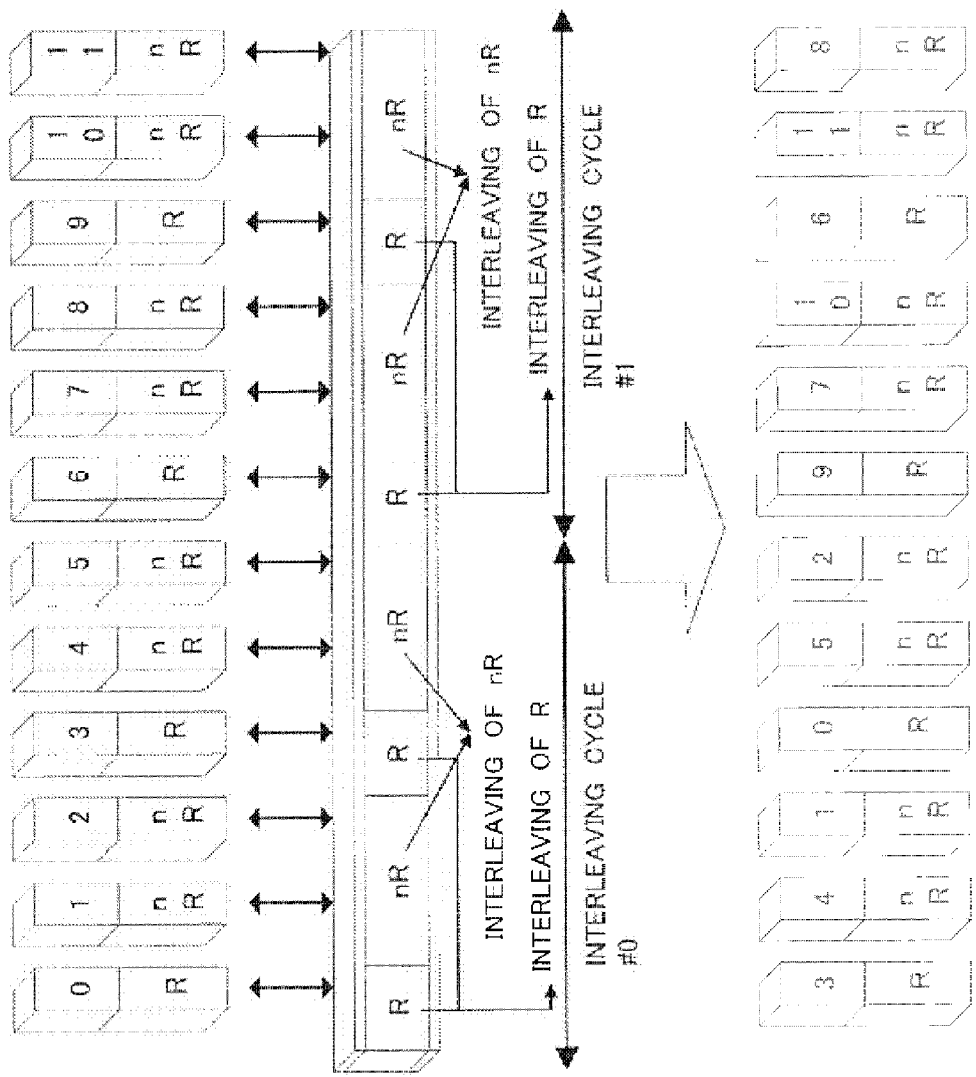
FIG. 7 is an explanatory diagram illustrating the dynamic interleaving cycle changing method, which illustrates a state in which an interleaving cycle is changed.

Referring to FIG. 6, description is given of a main feature of the dynamic interleaving cycle changing method. FIG. 6 and FIG. 7 are explanatory diagrams each illustrating the dynamic interleaving cycle changing method, and illustrate a case where interleaving is performed for each type (among reference pictures and among non-reference pictures). In particular, FIG. 7 illustrates a state in which an interleaving cycle is changed.

For the description, there is herein exemplified transmission of video frames (pictures) encoded in conformity to a video compression standard (for example, H.264/AVC, MPEG-4, or MPEG-2) for real-time data, which is available in wireless communication. In FIG. 6 and FIG. 7, "R" represents a reference picture (I-picture), and "nR" represents a non-reference picture (B-picture, including a P-picture for some standards).

The reference picture is a picture (frame) independently encoded within its screen alone irrespective of preceding and following frames while the non-reference picture is a frame encoded through prediction from predetermined pictures (for example, pictures at preceding and following positions of the subject picture).

FIG. 6 illustrates pictures #0 to #11 in a certain interleaving cycle. In the example illustrated in FIG. 6, twelve pictures are to be interleaved in one interleaving cycle. In this case, the pictures #0, #3, #6, and #9 are the reference pictures R, and the remaining pictures #1, #2, #4, #5, #7, #8, #10, and #11 are the non-reference pictures nR.

The arrangement order of the pictures #0 to #11 is changed among the pictures of each type. Specifically, interleaving processing for the reference pictures R and interleaving processing for the non-reference pictures nR are executed within the interleaving cycle, respectively.

FIG. 7 illustrates a state in which the interleaving cycle is shortened, that is, the interleaving cycle is changed so that six pictures are to be interleaved in one interleaving cycle. In the example illustrated in FIG. 7, the one interleaving cycle illustrated in FIG. 6 is changed into two interleaving cycles #0 and #1. Further, the pictures #0 to #5 are to be interleaved in the interleaving cycle #0 and the pictures #6 to #11 are to be interleaved in the interleaving cycle #1. In each of the interleaving cycles #0 and #1, interleaving processing is performed on the same type.

In the dynamic interleaving cycle changing method of this embodiment, the interleaving cycle is shortened when the wireless status (quality of the transmission path of the section A illustrated in FIG. 5) is good. On the other hand, the interleaving cycle is lengthened in a case where the wireless status (quality of the transmission path) is deteriorated.

In a case where the interleaving cycle is lengthened, it is desired that the interleaving cycle be set so as not to influence the streaming reproduction. Specifically, a maximum interleaving cycle is desirably set to have a value determined in consideration of a size of a buffer on the decoding side (reception device), in which streaming data before decoding is accumulated. This is because decoding processing (deinterleaving) may not be performed properly if the buffer is unable to accumulate data corresponding to one interleaving cycle. It should be noted that a method of determining the maximum interleaving cycle is not particularly described in the present application.

Figure 8:
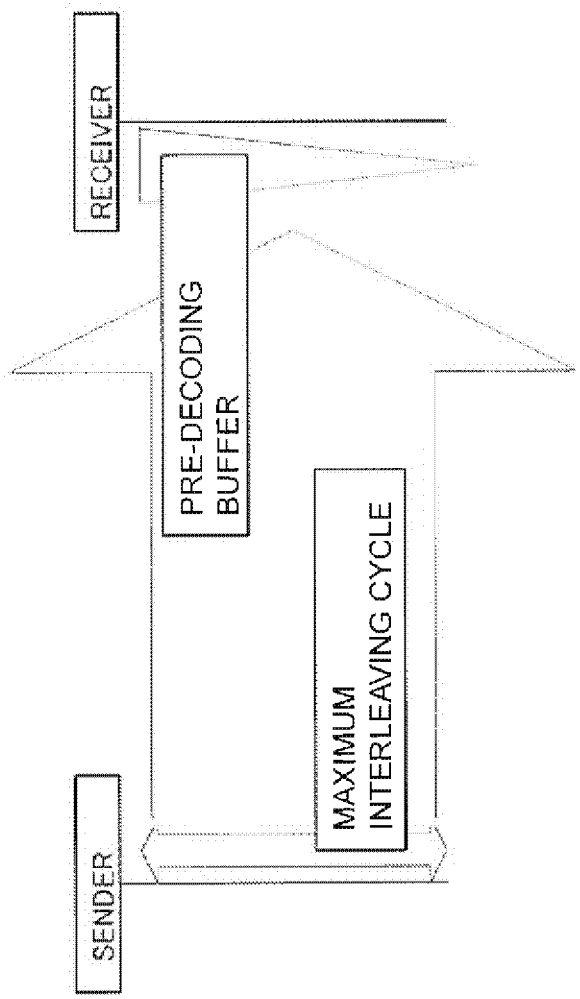
FIG. 8 is an explanatory diagram illustrating a relation between a maximum interleaving cycle and a pre-decoding buffer.

FIG. 8 is an explanatory diagram illustrating a relation between the maximum interleaving cycle and the pre-decoding buffer. An interleaving cycle for streaming data (real-time data) to be transmitted from a sender side toward a receiver side is adjusted so as to have a value smaller than the buffer size of the pre-decoding buffer.

When the interleaving cycle is lengthened, the transmission tends to be influenced by delay. Specifically, even if a slight delay has occurred, the buffering time of the pre-decoding buffer is exceeded on the decoding side (reception side). The real-time service such as streaming data transmission is generally given a higher priority of transmission in the network in many cases. Therefore, in a case where the quality of the wireless transmission path is poor, an interleaving effect (error reduction) is given as high a priority as possible over avoidance of the risk of delay. After that, when the quality of the wireless transmission path is improved, the interleaving cycle is shortened because the risk of delay no longer needs to be kept high.

Further, as described above, the interleaving is performed among the reference pictures R and among the non-reference pictures nR, respectively, in order to avoid a case where the reference pictures become contiguous through the interleaving. Accordingly, transmission intervals between the reference pictures may be maximized by interleaving the reference pictures and the non-reference pictures separately of each other.

It may be noted that the examples illustrated in FIG. 6 and FIG. 7 are described on the premise that the real-time data stream has already been interleaved in conformity to the RFC 3984 or the like.

Further, in a case where interleaving is performed on the stream sender side (transmission device of FIG. 5), the interleaving cycle to be applied in the dynamic interleaving cycle changing method of this embodiment is defined as follows.

Figure 9:
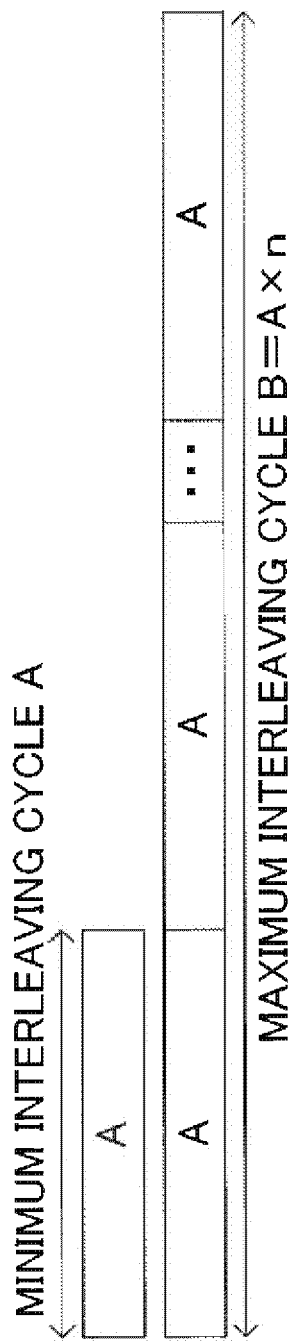
FIG. 9 is a diagram illustrating a definition of the interleaving cycle in a case where the interleaving is performed on a sender side.

FIG. 9 illustrates a definition of the interleaving cycle in the case where interleaving is performed on the sender side. As illustrated in FIG. 9, in the case where interleaving is performed on the sender side, a minimum interleaving cycle A to be applied in the dynamic changing method is defined so as to have a length identical with the length of the interleaving cycle on the sender side. Further, a maximum interleaving cycle B to be applied in the dynamic changing method is defined so as to be n times (n=1, 2, 3, . . . , n) as long as the minimum interleaving cycle A. The interleaving cycle is changed in units of the minimum interleaving cycle A.

In addition, though not illustrated, for example, refresh pictures such as instantaneous decoding refresh (IDR) pictures in the H.264/AVC are not to be interleaved in consideration of a case where transmission is delayed due to the interleaving and hence the possibility of recovery through retransmission is lowered. Specifically, the IDR picture is a refresh picture, which is a head picture of an image sequence, and hence the number of the pictures is much smaller than the number of pictures of other types. Therefore, more importance is placed on certainty of the transmission than on error distribution. Accordingly, the refresh picture may be transmitted without any influence of the interleaving performed in the relay device.

[Application Example]

An application example of this embodiment is described below. As the application example, a case where the dynamic interleaving cycle changing method described above is applied to a wireless network system is contemplated, targeting a wireless LAN system as the wireless network system.

<Configuration Example of Network>

Figure 10:
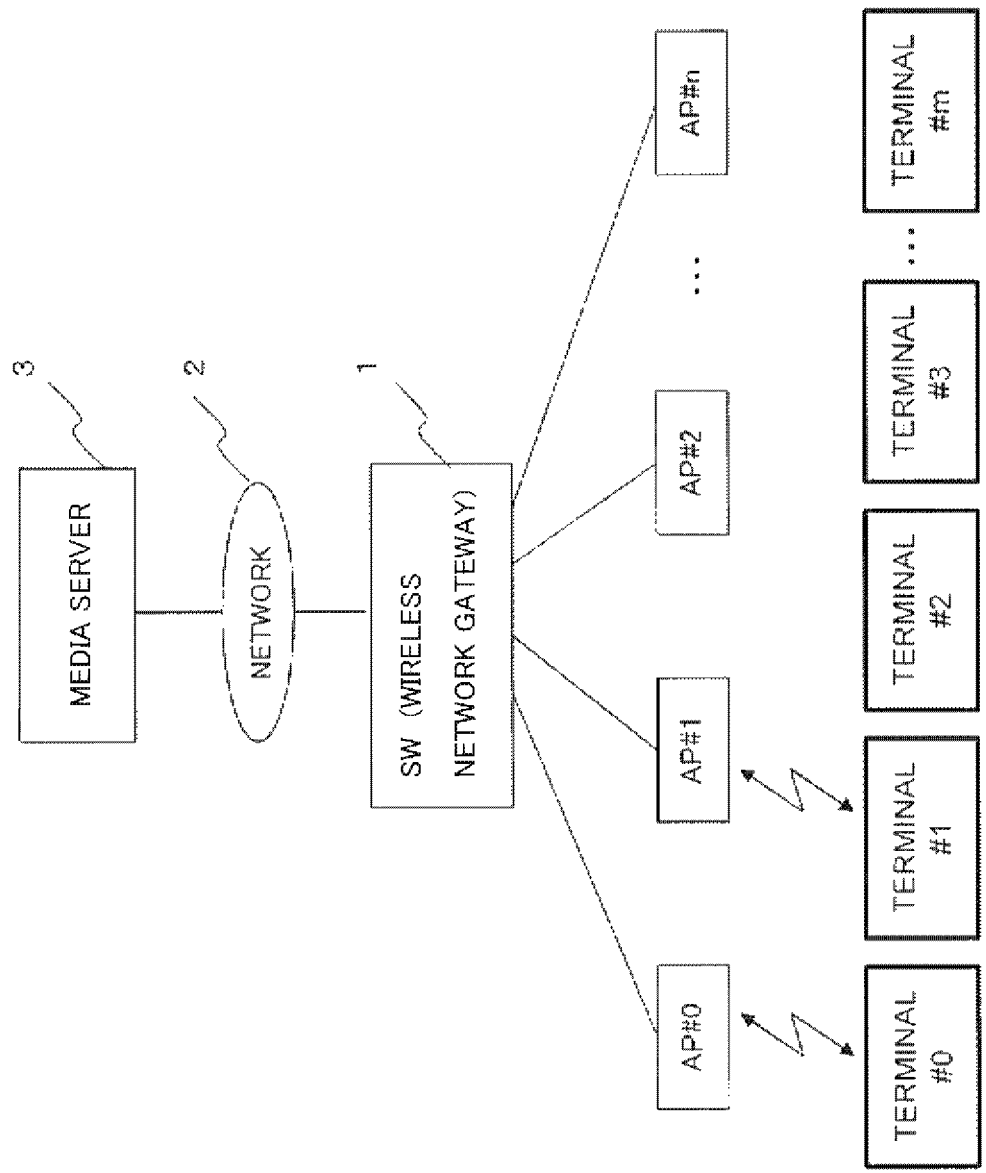
FIG. 10 is a diagram illustrating a configuration example of a wireless LAN system in an application example.

FIG. 10 illustrates a configuration example of the wireless LAN system in the application example. In FIG. 10, the wireless LAN system includes a plurality of access points (hereinafter, referred to as "APs") #0 to #n serving as a plurality of wireless transceivers, and a relay device (relay station or switch (SW)) having a function as a controller that controls each of the plurality of APs #0 to #n.

Figure 1:
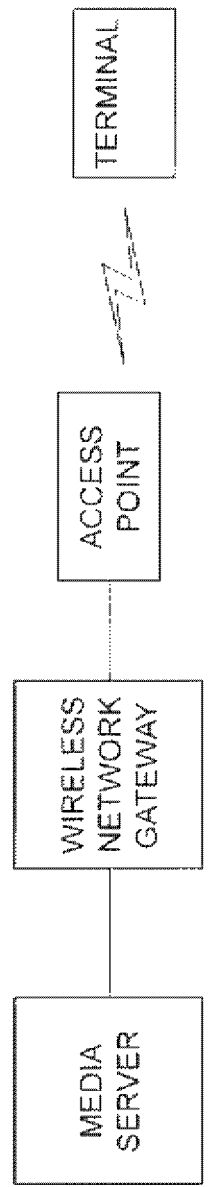
FIG. 1 is a diagram illustrating an example of a wireless LAN system.
Figure 2:
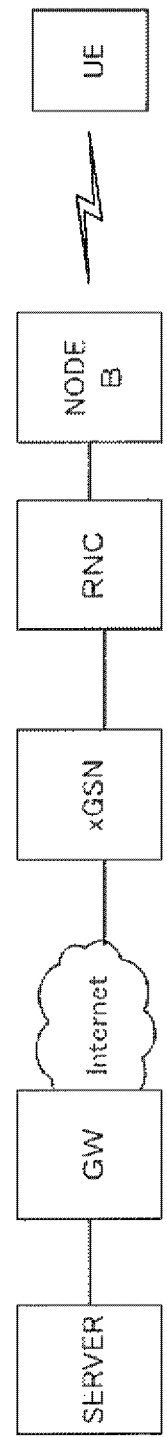
FIG. 2 is a diagram illustrating an example of a cellular network system.
Figure 3:
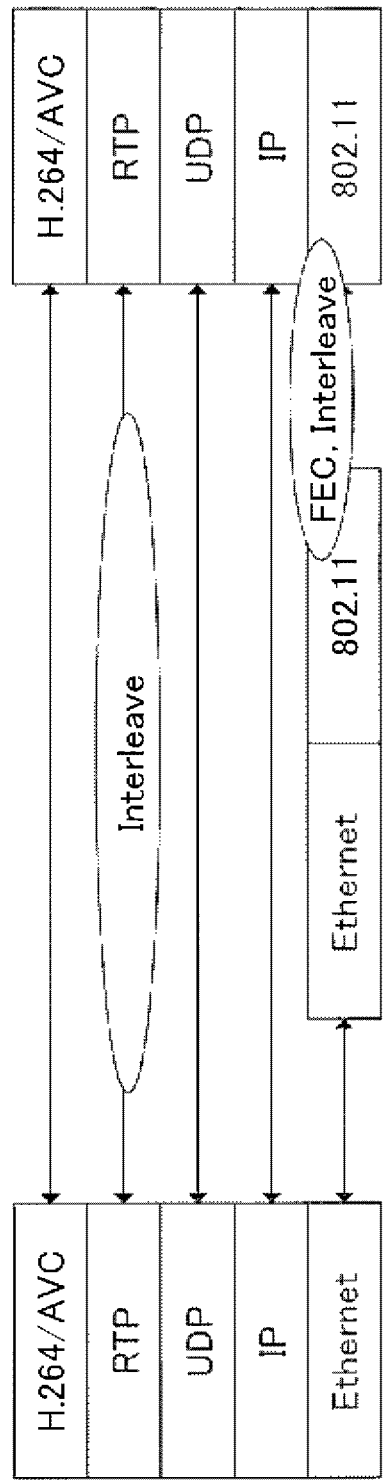
FIG. 3 is a diagram illustrating a general protocol stack in a case where the IEEE 802.11 is applied to a wireless network.
Figure 4:
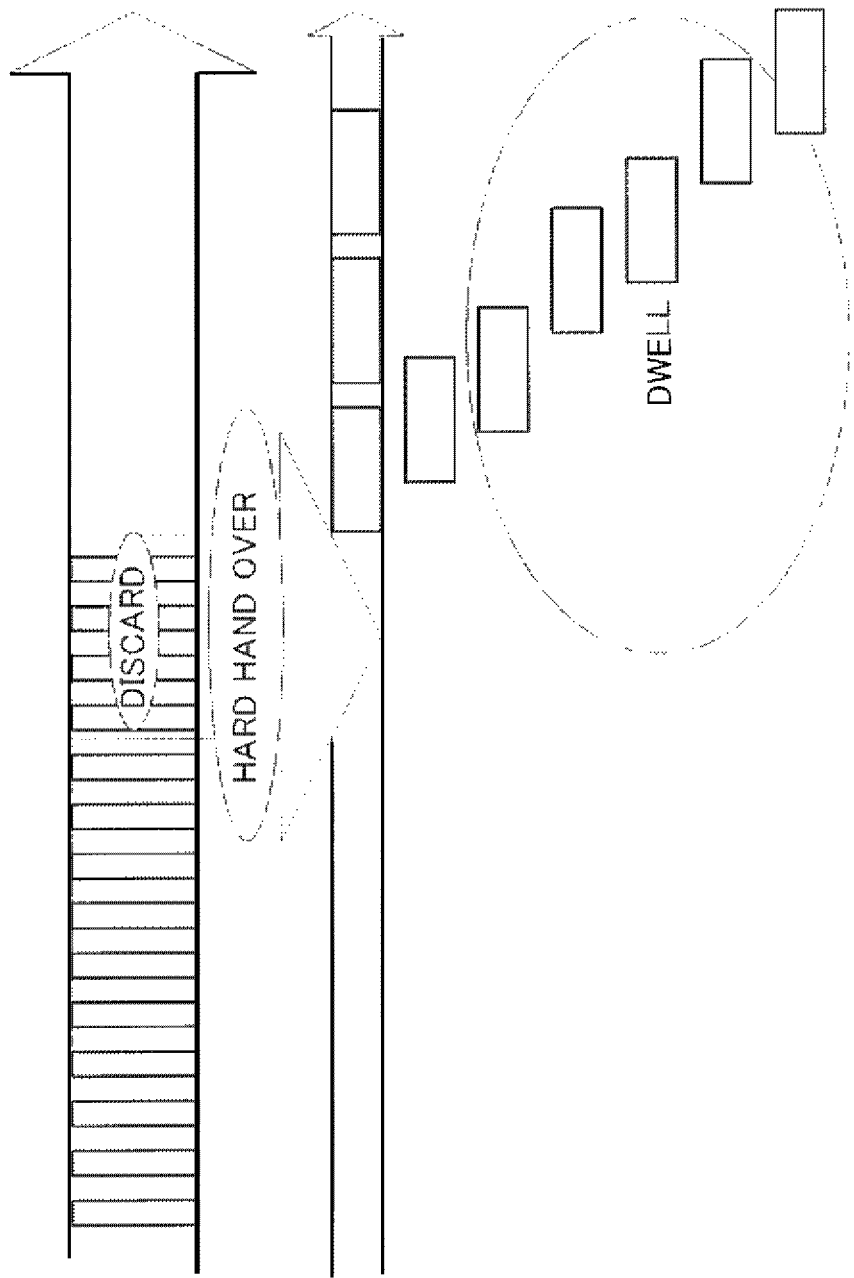
FIG. 4 is an explanatory diagram illustrating occurrence of discard and dwell of data at a time of hard handover.

A SW 1 corresponds to, for example, the radio network gateway (RN-GW) illustrated in FIG. 1. The SW 1 is connected to a media server (server) 3 serving as a transmission station via a network (IP network such as the Internet) 2.

A plurality of wireless terminals #0 to #m serving as a plurality of reception stations (reception devices) each establish wireless connection (wireless access) to a given AP (for example, nearest AP), and may receive data that is distributed from the media server 3 and is provided through the real-time service (real-time data, for example, multimedia data, in particular, video stream data) via the SW 1 and the AP that is connected wirelessly to the wireless terminal itself.

For example, a "media aware network element (MANE)" described in the RFC 3984 is installed to the SW 1. The MANE is a network element such as a middlebox or an application layer gateway that is capable of parsing a part of RTP payload headers or an RTP payload, and reacting to the contents of media.

Data for the terminal is transmitted from the SW 1 to the AP that is superordinate to the terminal which is a destination of the data. For example, when the SW 1 receives data for the terminal #0, the data is transmitted to the terminal #0 via the AP #0. In this case, information on quality of the wireless link between the AP #0 and the terminal #0 is reported from the AP #0 to SW 1. The AP #0 receives transmission power control information for the AP #0 via a wireless uplink provided between the AP #0 and the terminal #0, and then such power control information is reported to the SW 1. Alternatively, in a case where retransmission control is performed between the AP #0 and the subordinate terminal (for example, terminal #0), the AP #0 may report, to the SW 1, retransmission information received from the terminal.

<Configuration Example of SW (Relay Device)>

Figure 11:
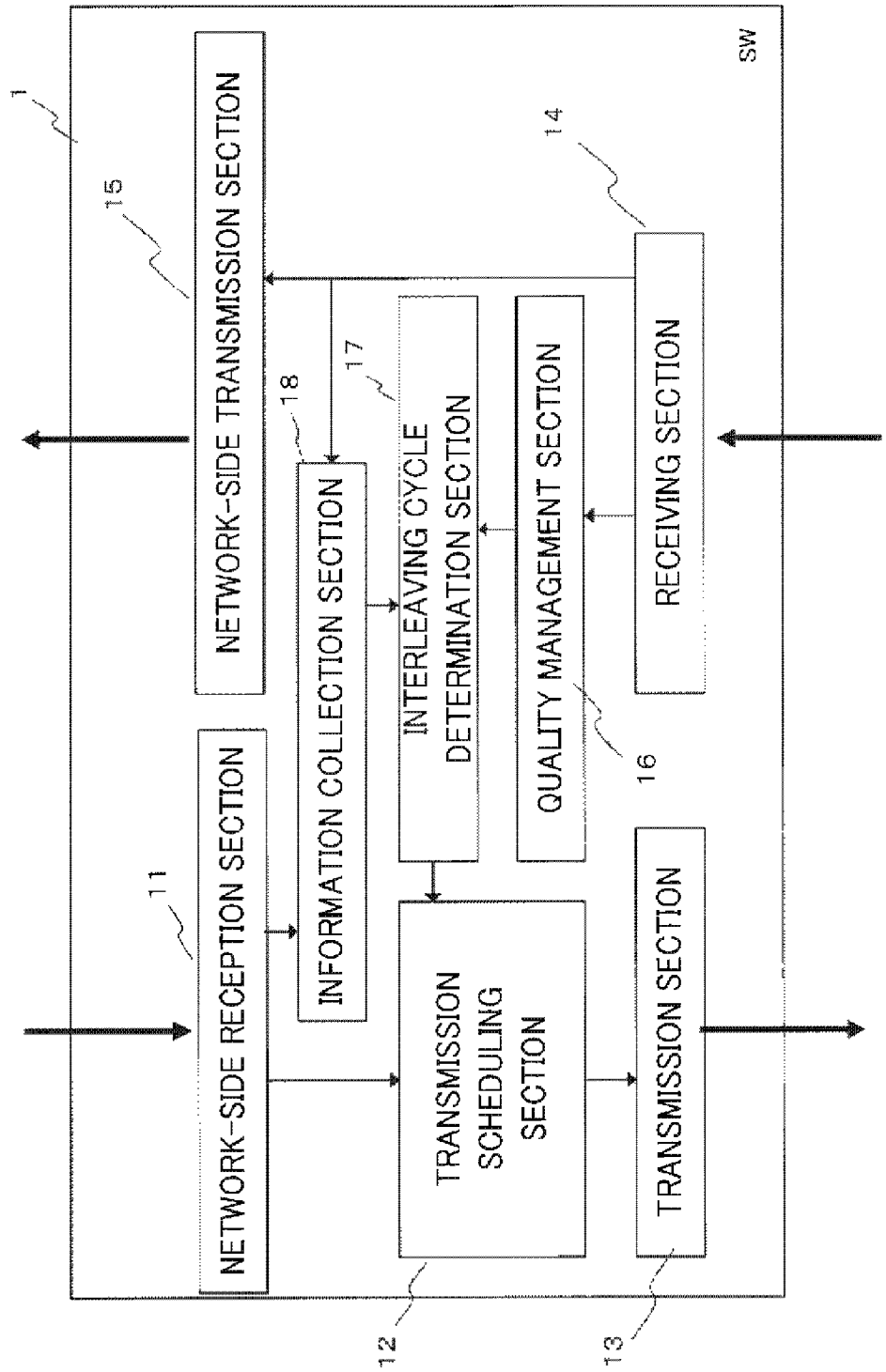
FIG. 11 is a block diagram illustrating a basic configuration example of a SW illustrated in FIG. 10.

FIG. 11 is a block diagram illustrating a basic configuration example of the SW 1. The SW 1 includes: a network-side reception section 11 connected to a network (for example, network 2 of FIG. 10); a transmission scheduling section 12 that serves as an interleaving section and is connected to the network-side reception section 11 and an interleaving cycle determination section 17; a transmission section 13 connected to the transmission scheduling section 12, and a reception section 14, which are connected to one or more APs (for example, APs #0 to #n of FIG. 10); a network-side transmission section 15 connected to the reception section 14 and the network (for example, network 2 of FIG. 10); a quality management section 16 that serves as a monitoring section and is connected to the reception section 14; the interleaving cycle determination section 17 that serves as a determination section and is connected to the quality management section 16; and an information collection section 18 connected to the network-side reception section 11, the reception section 14, and the interleaving cycle determination section 17.

The network-side reception section 11 receives data for the terminal from the network (network 2). The network-side reception section 11 analyzes contents of the received data, and provides information regarding an analysis result to the information collection section 18. The information regarding the analysis result is, for example, information on capability exchange that is performed between the transmission station (for example, media server 3 of FIG. 10) for data provided through the real-time service (real-time data) and the terminal (reception station). The capability exchange information may contain information regarding whether or not interleaving is performed and information indicating an interleaving cycle at the time when the interleaving is performed. The network-side transmission section 15 transmits data from the reception section 14 to the network side (network 2).

The information collection section 18 provides, to the interleaving cycle determination section 17, the data that has been provided from the network-side reception section 11, and the data that has been provided from the reception section 14. The data from the reception section 14 may at least contain the capability exchange information as described above.

The transmission scheduling section 12 interleaves the data that has been received from the network-side reception section 11 according to information that has been provided from the interleaving cycle determination section, and transfers the data to the transmission section 13. The transmission scheduling section 12 includes a data buffer to be used for interleaving processing and the like, and the data that has been received from the network-side reception section 11 is temporarily stored in the data buffer.

The interleaving cycle is changed on an interleaving cycle basis. Specifically, even when a change to the interleaving cycle of a schedule that has already been completed is determined, the interleaving cycle is not canceled, which has already been determined for use in that schedule.

In other words, in a case where interleaving has already been scheduled in a certain interleaving cycle when a change to the interleaving cycle is determined, the transmission scheduling section 12 does not cancel the interleaving cycle to be applied in that schedule and interleaves the data stored in the data buffer in the certain interleaving cycle. After that, when the schedule is completed, the transmission scheduling section 12 changes the interleaving cycle at a time of the next schedule according to the information that has been provided from the interleaving cycle determination section 17.

The interleaving cycle determination section 17 determines the interleaving cycle based on information that has been provided from the quality management section 16 and information that has been provided from the information collection section 18. The interleaving cycle is determined on a minimum interleaving cycle basis. Specifically, the interleaving cycle is determined so as to be an integral multiple of the minimum interleaving cycle.

For example, the interleaving cycle determination section 17 may receive information regarding the maximum interleaving cycle from the quality management section 16. The information regarding the maximum interleaving cycle is, for example, a size of the pre-decoding buffer that is included in the terminal. In a case where the size of the pre-decoding buffer is provided, the interleaving cycle determination section 17 determines the maximum interleaving cycle in a range in which the maximum interleaving cycle does not exceed the size (buffering time) of the pre-decoding buffer, and defines the maximum interleaving cycle so that the maximum interleaving cycle becomes m times (m is a positive integer) as long as the minimum interleaving cycle.

Further, for example, in a case where there is provided, from the information collection section 18, information (including the interleaving cycle) indicating that the interleaving is performed between the transmission station (media server 3) for the real-time data and the terminal, the same value as that of the interleaving cycle for the interleaving performed between the transmission station and the terminal is determined as the minimum unit of the interleaving cycle (minimum interleaving cycle) for the interleaving to be performed by the SW 1. The maximum interleaving cycle in this case is defined to have n times (n is a positive integer) the value of the minimum interleaving cycle. At this time, in a case where the size of the pre-decoding buffer of the terminal has already been known, the maximum interleaving cycle is determined in a range in which the maximum interleaving cycle does not exceed the maximum interleaving cycle determined based on the size of the buffer (buffering time). The interleaving cycle is changed on the minimum interleaving cycle basis irrespective of whether or not the interleaving is performed between the transmission station and the terminal.

The definition of the interleaving cycle is summarized as follows.

(maximum interleaving cycle)=(minimum interleaving cycle 1)×m (interleaving cycle)=(minimum interleaving cycle 1)×n (n≤m)

The interleaving cycle determination section 17 may receive, from the quality management section 16, information indicating whether the quality of the wireless link (quality of the wireless transmission path) between the AP and the terminal tends to be deteriorated or improved (wireless link quality information). In a case where the wireless link quality information indicates that the quality tends to be deteriorated, the interleaving cycle determination section 17 determines the interleaving cycle longer than the interleaving cycle that is currently used (lengthen the interleaving cycle). On the other hand, in a case where the wireless link quality information indicates that the quality tends to be improved, the interleaving cycle determination section 17 determines the interleaving cycle shorter than the interleaving cycle that is currently used (shorten the interleaving cycle). It should be noted that the interleaving cycle determination section 17 determines the interleaving cycle in a range of from the minimum interleaving cycle to the maximum interleaving cycle.

The quality management section 16 periodically determines (detects) quality of the wireless link based on information from the reception section 14, and provides the wireless link quality information thus determined to the interleaving cycle determination section 17. The quality management section 16 may receive, from the reception section 14, ACK/NACK information (information indicating success or failure in data reception performed in the physical layer) from the terminal recognized by the reception section 14, and/or power level information (transmission power level indication information received in an inner loop and associated with a fluctuation in target signal to interference ratio (SIR). Increase thereof indicates that quality is deteriorated while decrease thereof indicates that quality is improved). The quality management section 16 may generate the wireless link quality information by using at least one of the ACK/NACK information and the power level information.

The reception section 14 receives data transmitted from the terminal via the corresponding AP, and transfers the received data to the network-side transmission section 15. Further, the reception section 14 provides, to the quality management section 16, information regarding the quality of the wireless link such as the ACK/NACK information or the power level information from the terminal, which is contained in the received data. The transmission section 13 transmits data to the terminal (corresponding AP) in an order of data transferred from the transmission scheduling section 12.

It may be noted that the SW 1 is a device including a plurality of hardware components such as a processor (controller) such as a CPU, a memory (storage device), an input/output interface (I/O), and a communication interface, and each of the blocks illustrated in FIG. 11 is a function to be implemented by at least one of the hardware components described above or the processor executing software (program).

<Flow of Determining Interleaving Cycle>

Figure 12:
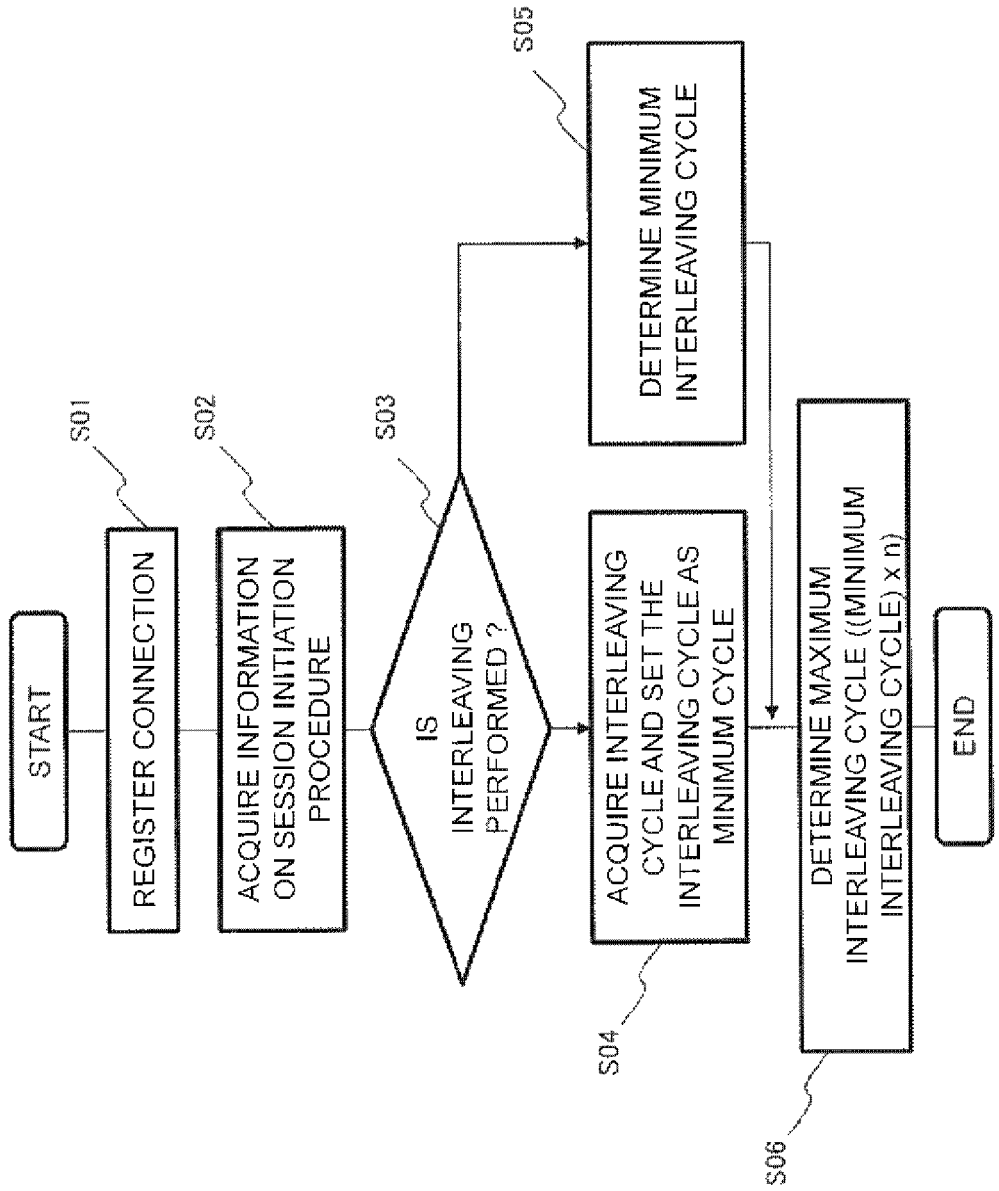
FIG. 12 is a flow chart illustrating an example of interleaving cycle determination processing performed by an interleaving cycle determination section.

FIG. 12 is a flow chart illustrating an example of interleaving cycle determination processing performed by the interleaving cycle determination section 17. In FIG. 12, when connection for transmitting data (real-time data (for example, video stream data)) between the data transmission station (for example, media server 3) and the terminal is registered in the SW 1 (Step S01), as information on an RTP session initiation procedure, the capability exchange information for the transmission station and the terminal is transmitted and received between the transmission station and the terminal.

At this time, the network-side reception section 11 receives information indicating whether or not interleaving is performed and information indicating an interleaving cycle at the time when the interleaving is performed that are transmitted from the transmission station as the capability exchange information, which are then provided to the information collection section 18, and then further provided to the interleaving cycle determination section 17 (Step S02).

The interleaving cycle determination section 17 judges whether or not interleaving is performed between the transmission station and the terminal based on the information indicating whether or not the interleaving is performed, which has been acquired from the information collection section 18 (Step S03). At this time, in a case where the interleaving is performed (S03; Y), the interleaving cycle determination section 17 advances the processing to Step S04. In a case where the interleaving is not performed (S03; N), the interleaving cycle determination section 17 advances the processing to Step S05.

In Step S04, the interleaving cycle determination section 17 sets the interleaving cycle for the interleaving performed between the transmission station and the terminal, which has been acquired from the information collection section 18, as a minimum cycle (minimum interleaving cycle) of the interleaving cycle for the interleaving to be performed by the SW 1, and advances the processing to Step S06.

In Step S05, the interleaving cycle determination section 17 determines a minimum interleaving cycle, and advances the processing to Step S06.

In Step S06, the interleaving cycle determination section 17 determines a maximum interleaving cycle. The maximum interleaving cycle is determined so as to be n times or m times (provided that n≤m) as long as the minimum interleaving cycle. At this time, in a case where the size of the pre-decoding buffer of the terminal is contained in the information from the information collection section 18, the maximum interleaving cycle is determined in consideration of the size of the buffer.

After Step S06 is finished, the processing of determining the maximum and minimum interleaving cycles is ended. It should be noted that, in Step S06, an initial value of the interleaving cycle is determined. As the initial value, for example, the minimum interleaving cycle is applied, though an interleaving cycle having an arbitrary length may be applied as the initial value.

<Example of Determining Quality of Wireless Link>

The quality management section 16 determines quality of the wireless link periodically (every predetermined quality monitoring cycle). The quality management section 16 may determine quality of the wireless link based on, for example, a result of monitoring the ACK/NACK information that is received within a predetermined measurement period (time period) of the quality monitoring cycle. For example, the quality management section 16 calculates, based on ACK/NACK information that is received within a measurement period (for example, one second), transmission quality (quality of the wireless link) within the measurement period. For example, the number of NACKs (ACKs) that are received within the measurement period may be calculated as quality of the wireless link.

The quality management section 16 compares the calculated quality of the wireless link with quality of the wireless link that has been calculated with regard to a previous measurement period, to thereby judge whether the quality of the wireless link is improved, deteriorated, or unchanged. For example, in a case where the number of NACKs that are received within the measurement period indicates the quality of the wireless link, if a current number of NACKs is larger than a previous number of NACKs, it is judged that "quality is deteriorated". If the current number of NACKs is smaller than the previous number of NACKs, it is judged that "quality is improved", and if the current number of NACKs is equal to the previous number of NACKs, it is judged that "quality is unchanged".

Such a judgment result (any one of the results indicating that "quality is deteriorated", "quality is improved", and "quality is unchanged") is provided to the interleaving cycle determination section 17 as the wireless link quality information.

Further, in a case where the power level information is used for the determination of the quality of the wireless link, the following processing is performed. For example, one of the number of power-up indications and the number of power-down indications within a predetermined measurement period (for example, number of power-up indications) is calculated. Subsequently, a current number of power-up indications and a previous number of power-up indications within the measurement period are compared with each other. If the current number of power-up indications is larger than the previous number of power-up indications, it is judged that "quality is deteriorated". Conversely, if the current number of power-up indications is smaller than the previous number of power-up indications, it is judged that "quality is improved". If the current number of power-up indications is equal to the previous number of power-up indications, it is judged that "quality is unchanged".

Both the quality judgment that is based on the number of ACKs/NACKs and the quality judgment that is based on the power level information may be executed to provide, to the interleaving cycle determination section 17, a logical product (AND) or a logical sum (OR) of each of the judgment results as the wireless link quality information indicating the final result of quality judgment.

<Flow of Changing Interleaving Cycle>

Figure 13:
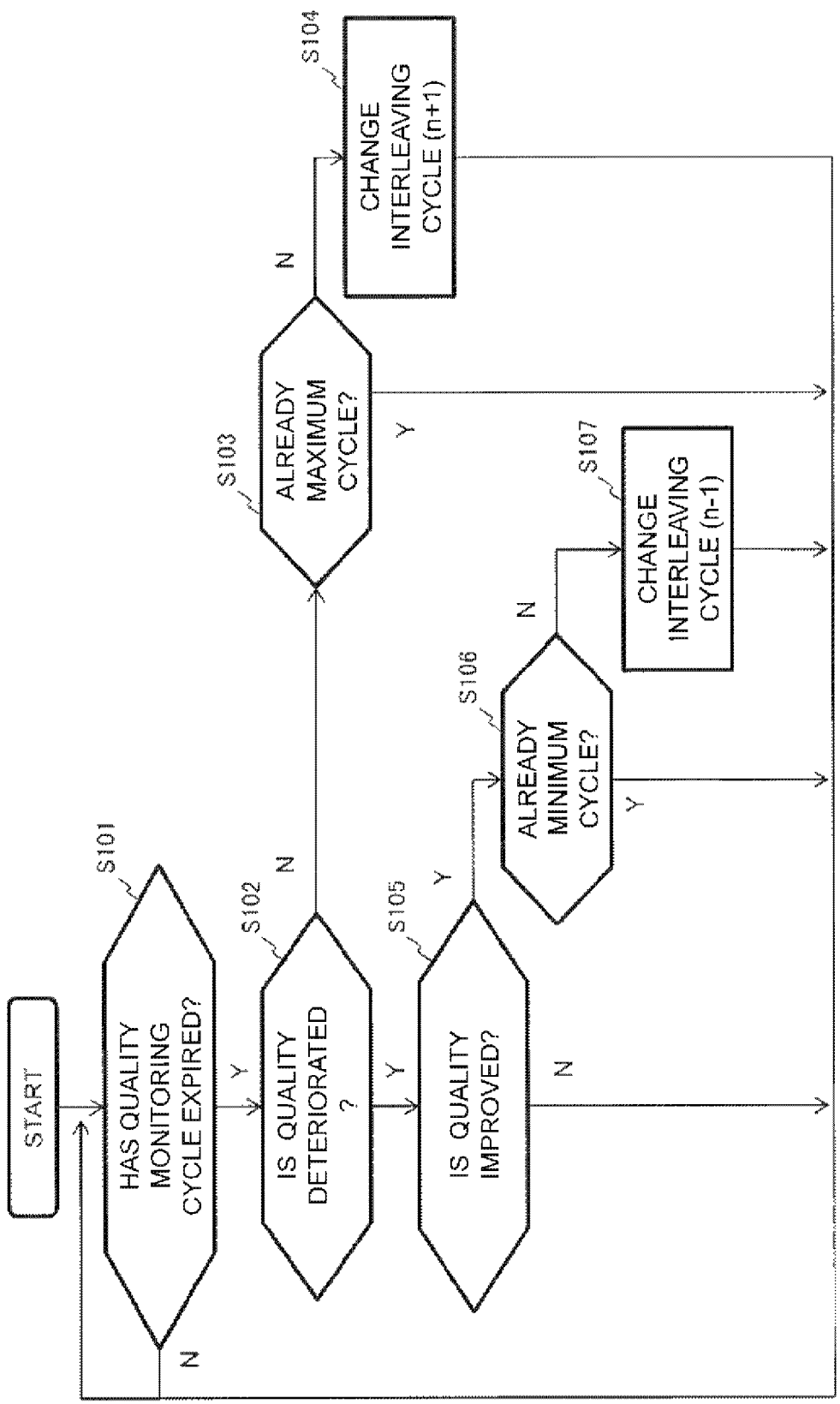
FIG. 13 is a flow chart illustrating an example of interleaving cycle changing processing.

FIG. 13 is a flow chart illustrating an example of interleaving cycle changing processing. The quality management section 16 provides, to the interleaving cycle determination section 17, the wireless link quality information of every quality monitoring cycle. When the quality monitoring cycle has expired (S101), the interleaving cycle determination section 17 refers to the wireless link quality information that has been provided from the quality management section 16 to judge whether or not the wireless link quality information indicates that quality is deteriorated (S102).

At this time, in a case where the wireless link quality information indicates that quality is deteriorated (S102, Y), the processing advances to Step S103. In a case where the wireless link quality information does not indicate that quality is deteriorated (S102, N), the processing advances to Step S105.

In a case where the processing advances to Step S103, the interleaving cycle determination section 17 judges whether or not the current interleaving cycle is already the maximum interleaving cycle (maximum cycle).

At this time, in a case where the current interleaving cycle is not the maximum cycle (S103, N), the interleaving cycle determination section 17 changes the interleaving cycle (S104). Specifically, the interleaving cycle determination section 17 changes the current interleaving cycle to an interleaving cycle obtained by adding one minimum interleaving cycle, and notifies the transmission scheduling section 12 of the changed interleaving cycle. After that, the processing returns to Step S101.

Conversely, in a case where the current interleaving cycle is the maximum cycle (S103, Y), the interleaving cycle determination section 17 does not change the current interleaving cycle, and returns the processing to Step S101.

In a case where the processing advances to Step S105, the interleaving cycle determination section 17 judges whether or not the wireless link quality information indicates that quality is improved. At this time, in a case where the wireless link quality information indicates that quality is improved (S105, Y), the processing advances to Step S106. In a case where the wireless link quality information does not indicate that quality is improved (S105, N (quality is unchanged)), the interleaving cycle determination section 17 does not change the interleaving cycle, and returns the processing to Step S101.

In a case where the processing advances to Step S106, the interleaving cycle determination section 17 judges whether or not the current interleaving cycle is already the minimum interleaving cycle (minimum cycle).

At this time, if the current interleaving cycle is not the minimum cycle (S106, N), the interleaving cycle determination section 17 shortens the current interleaving cycle. Specifically, the interleaving cycle determination section 17 changes the current interleaving cycle so that the resultant interleaving cycle has a length that is shorter than the current interleaving cycle by a length of one minimum cycle, and notifies the transmission scheduling section 12 of the changed interleaving cycle. After that, the processing returns to Step S101.

Conversely, if the current interleaving cycle is the minimum cycle (S106, Y), the interleaving cycle determination section 17 does not change the current interleaving cycle, and returns the processing to Step S101.

The transmission section 13 notifies the terminal of the interleaving cycle that has been determined by the SW 1 for deinterleaving processing to be performed on the receiver side. As described above, the interleaving cycle is dynamically changed by the SW 1 (relay device) according to the quality of the transmission path.

<Collection of Information>

Next, description is given of various kinds of information to be collected by the SW 1. For example, in the H.264, a network abstraction layer (NAL) unit is encapsulated into an RTP packet for transmission thereof. The NAL unit is assigned a header, and based on information of the header, what kind of data is carried by the RTP packet may be detected. From the information of the header, information indicating a type such as the reference picture or the non-reference picture may be obtained.

Figure 14:
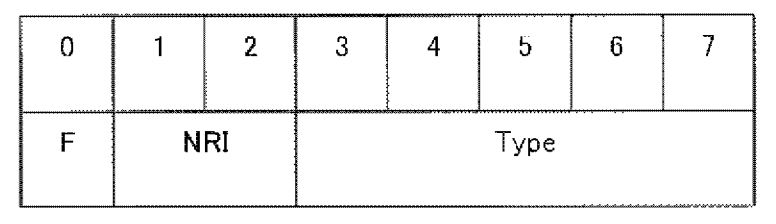

FIG. 14 is a diagram illustrating a data structure of a NAL unit header. The NAL unit header has a field for storing NRI bits. By referring to the values of the NRI bits, it is possible to judge whether the data to be carried is data regarding the reference picture or data regarding the non-reference picture. Such judgment is performed when, for example, the transmission scheduling section 12 performs interleaving.

Further, with regard to stream data to be transferred from the transmission station (media server 3) toward the terminal, whether or not the transmission station performs interleaving may be checked when the SW 1 acquires the capability exchange information in conformity to the session description protocol (SDP) if the video compression standard for the stream data is, for example, the H.264/AVC.

For example, in a case where a value of a parameter "sprop-interleaving-depth" contained in the capability exchange information is equal to or larger than 0, the value indicates that the interleaving is performed. Further, from a parameter "packetization mode" that is based on the SDP, whether or not the interleaving is performed may be recognized.

Further, whether or not the interleaving is performed may be judged from a type of a usable NAL unit. Specifically, when a NAL unit of a "single NAL unit packet" type may not be used but a NAL unit of a type such as an "STAP-B" type or an "MTAP" type is used instead, it may be judged that the interleaving is performed. The type of the NAL may be identified from a value of a "Type" field of the NAL unit header illustrated in FIG. 14.

A parameter "deint-buf-cap" from the terminal, which is based on the SDP, indicates a capacity of the buffer that accumulates data before decoding that is received by the terminal (pre-decoding buffer). The maximum interleaving cycle may be determined based on the capacity of the buffer indicated by this parameter.

<Technique of Interleaving>

Figure 15:
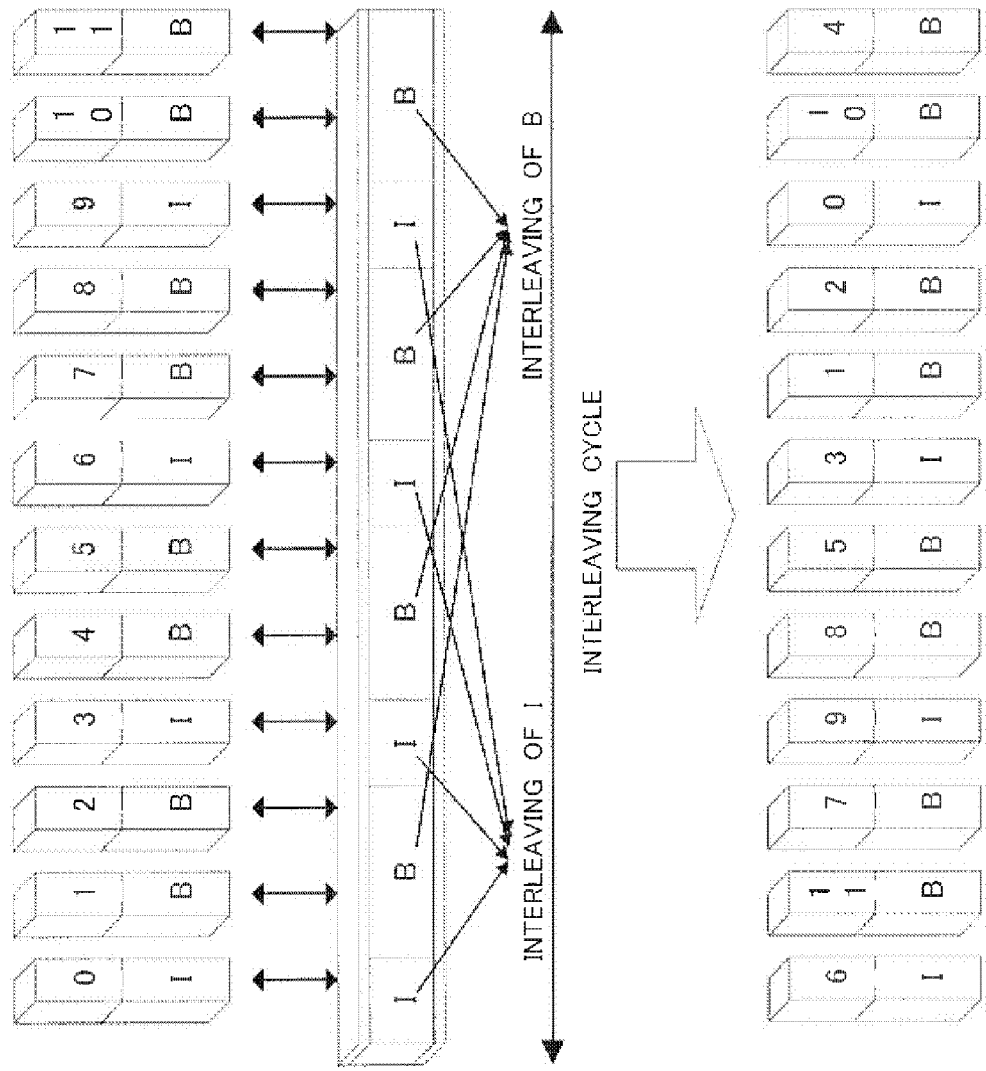
FIG. 15 is an explanatory diagram illustrating interleaving for a video stream (for example, video stream data encoded in conformity to H.264/AVC) containing I-pictures and B-pictures.

Next, description is given of interleaving performed by the transmission scheduling section 12. FIG. 15 is an explanatory diagram illustrating interleaving processing performed by the transmission scheduling section 12, and FIG. 16 is an explanatory diagram illustrating interleaving processing to which an interleaving cycle shorter than an interleaving cycle illustrated in FIG. 15 is applied.

Figure 16:
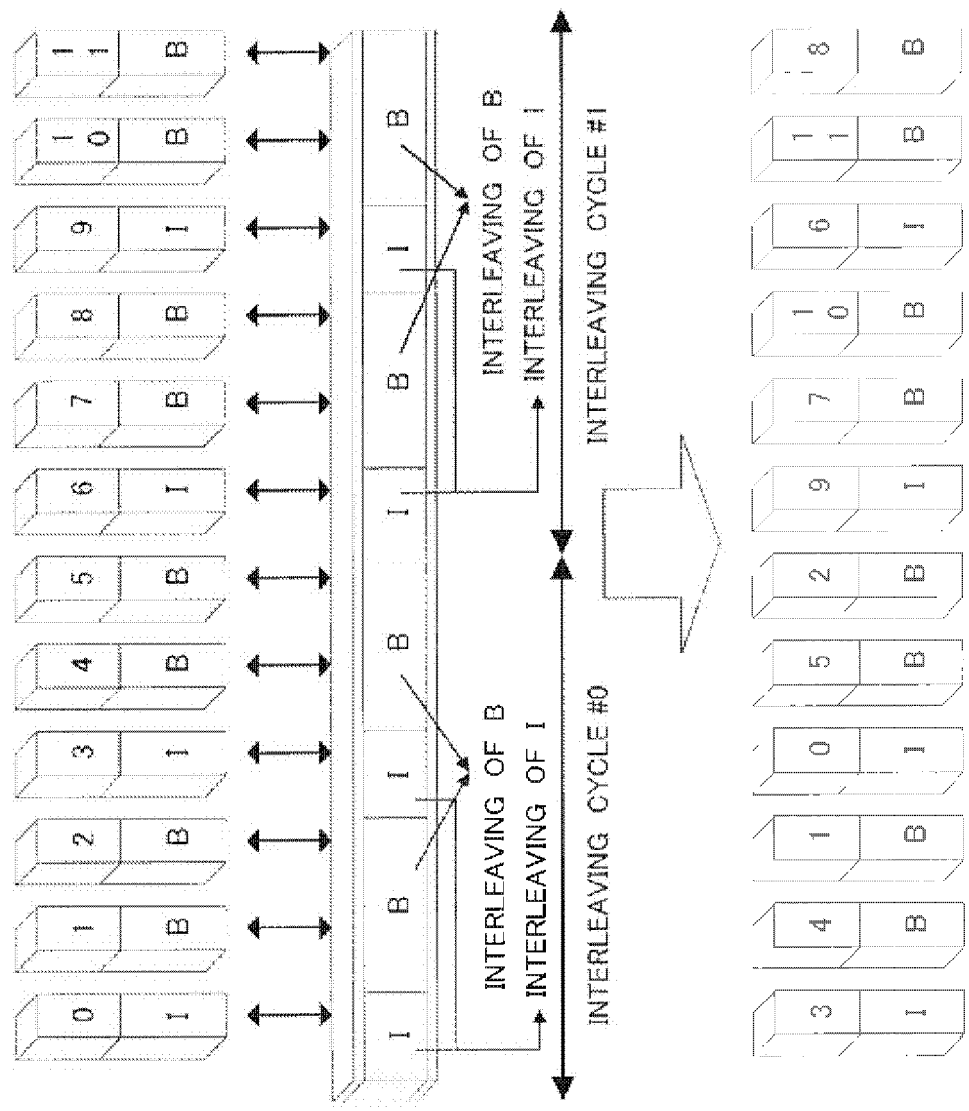
FIG. 16 is a diagram illustrating a state in which the interleaving cycle is changed.

In the examples of FIG. 15 and FIG. 16, it is assumed that video frames are to be transmitted from the transmission station (media server 3) toward the terminal. In FIG. 15 and FIG. 16, "I" denotes the I-picture (intra-picture: reference picture (also referred to as I-frame)) while "B" denotes the B-picture (bi-directional predictive-picture: non-reference picture (also referred to as B-frame)).

The I-picture is a picture (frame) independently encoded within its screen alone irrespective of preceding and following frames on a time base, and the B-picture is a picture (frame) encoded through bi-directional prediction from a past frame and a future frame.

In the example illustrated in FIG. 15, twelve frames are to be interleaved by the transmission scheduling section 12 in one interleaving cycle. It should be noted that, in order to avoid a case where the I-pictures become contiguous through the interleaving, the I-pictures and the B-pictures are interleaved separately of each other.

FIG. 16 exemplifies a state in which the interleaving cycle determination section 17 determines a change to the interleaving cycle, and the interleaving cycle for the interleaving to be performed by the transmission scheduling section 12 is changed. FIG. 16 further exemplifies a state in which the interleaving cycle is shortened due to improvement in quality of the wireless link. In each of interleaving cycles #0 and #1 illustrated in FIG. 16, interleaving is performed by using the same technique as that of FIG. 15 (interleaving performed on pictures of the same type).

Effect of the Embodiment

According to this embodiment, the interleaving cycle for interleaving real-time data (for example, video stream data) transmitted from the transmission station (media server 3) is dynamically changed according to the quality of the transmission path (quality of the wireless link).

In this manner, the interleaving cycle is lengthened in a case where the wireless link (wireless transmission path) is deteriorated, and hence data is dispersed in a longer section, to thereby reduce transmission path errors on the receiver side (data destination).

In particular, in a case where the deterioration in quality of the wireless transmission path triggers processing which may cause data delay, such as reduction of the transmission bandwidth or handover, the error rate of data that is to arrive at the receiver side is reduced through the interleaving, to thereby enable instantaneousness of real-time data to be secured as high as possible.

In other words, in an environment in which the deterioration in quality of the transmission path for real-time data may cause arrival delay or missing of real-time data, it is possible to enhance effectiveness of real-time data that is to arrive at the receiver side (destination) through the transmission path owing to the interleaving effect, and to provide an appropriate real-time service.

In this manner, in a case where a burst error or a temporary dwell has occurred, the longer interleaving cycle is set to disperse data, to thereby alleviate such a situation that there is no data to be reproduced during a time period in which real-time data is to be reproduced on the receiver side. This leads to an effect that quality of reproduction of media is unified even when the quality of the wireless link fluctuates.

Modified Example

A modification may be made so that the access point (AP) has the configuration of the SW 1 illustrated in FIG. 11 instead of the SW 1 (radio network gateway). Further, the configuration of the SW 1 is applicable to the radio network controller (RNC) or the base station device (Node B) in the cellular network system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay apparatus, comprising:
a reception section that receives real-time data;
a monitoring section that periodically detects quality of a transmission path to be used for transmitting the real-time data toward a destination thereof;
a determination section that determines a length of an interleaving cycle according to the quality of the transmission path;
an interleaving section that interleaves the real-time data in the interleaving cycle having the determined length; and
a transmission section that transmits the interleaved real-time data to the transmission path,
wherein the determination section determines a minimum unit of the interleaving cycle to determine the interleaving cycle so that the interleaving cycle becomes an integral multiple of the minimum unit,
wherein, in a case where the real-time data received by the reception section has been interleaved in a predetermined interleaving cycle, the determination section determines a length of the predetermined interleaving cycle as the minimum unit, and
wherein the relay apparatus further comprises an information collection section that acquires data contained in capability exchange information transmitted and received between a transmission source of the real-time data and the destination thereof via the relay apparatus, and provides the data to the determination section, the data indicating whether or not the transmission source performs interleaving, and indicating the interleaving cycle at a time when the interleaving is performed.

2. A relay apparatus, comprising:
a reception section that receives real-time data;
a monitoring section that periodically detects quality of a transmission path to be used for transmitting the real-time data toward a destination thereof;
a determination section that determines a length of an interleaving cycle according to the quality of the transmission path;
an interleaving section that interleaves the real-time data in the interleaving cycle having the determined length; and
a transmission section that transmits the interleaved real-time data to the transmission path, wherein:
the real-time data comprises video stream data containing reference pictures and non-reference pictures; and
the interleaving section interleaves the reference pictures and the non-reference pictures separately.

3. The relay apparatus according to claim 2, wherein the determination section lengthens the interleaving cycle in a case where the monitoring section detects deterioration in the quality of the transmission path.

4. The relay apparatus according to claim 2, wherein the determination section shortens the interleaving cycle in a case where the monitoring section detects improvement in the quality of the transmission path.

5. The relay apparatus according to claim 2, wherein the determination section determines a minimum unit of the interleaving cycle to determine the interleaving cycle so that the interleaving cycle becomes an integral multiple of the minimum unit.

6. The relay apparatus according to claim 5, wherein, in a case where the real-time data received by the reception section has been interleaved in a predetermined interleaving cycle, the determination section determines a length of the predetermined interleaving cycle as the minimum unit.

7. The relay apparatus according to claim 2, further comprising an information collection section that acquires a size of a buffer included in the destination of the real-time data, for storing the real-time data before decoding, wherein the determination section determines a maximum value of the interleaving cycle based on the size of the buffer.

8. A real-time data transfer method used in a relay apparatus that relays real-time data to be transmitted from a transmission apparatus toward a reception apparatus, the real-time data transfer method comprising:
receiving the real-time data;
monitoring quality of a transmission path to be used for transmitting the real-time data toward a destination thereof;
determining a length of an interleaving cycle according to the quality of the transmission path;
interleaving the real-time data in the interleaving cycle having the determined length; and
transmitting the interleaved real-time data to the transmission path,
wherein the real-time data comprises video stream data containing reference pictures and non-reference pictures, and the interleaving interleaves the reference pictures and the non-reference pictures separately.

* * * * *